Sept. 22, 1925.
J. RAU
1,554,464
PROCESS OF MOLDING BOTTLES
Filed April 24, 1925
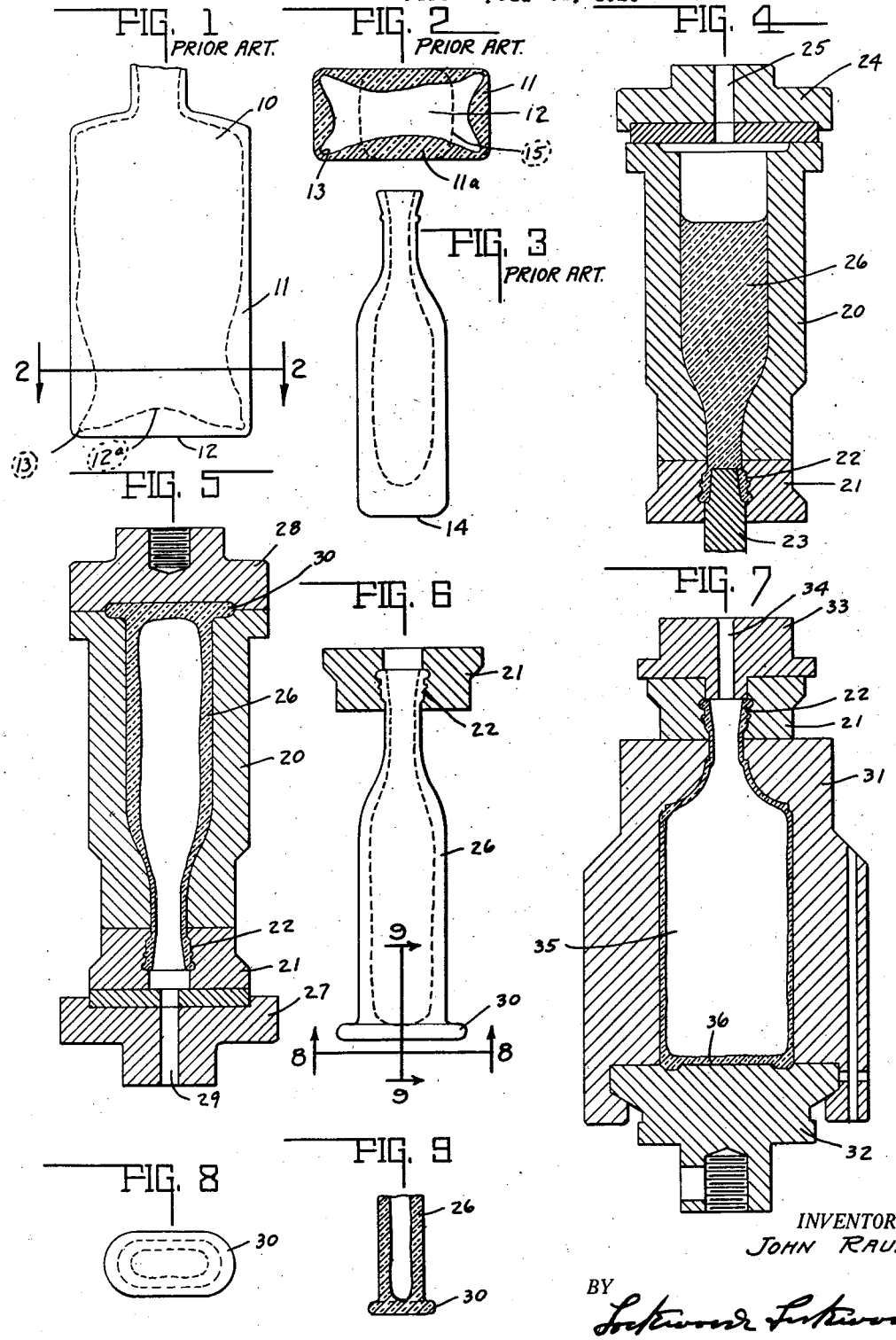
INVENTOR.
JOHN RAU.
BY
ATTORNEYS.

Patented Sept. 22, 1925.

1,554,464

UNITED STATES PATENT OFFICE.

JOHN RAU, OF INDIANAPOLIS, INDIANA, ASSIGNOR TO FAIRMOUNT GLASS WORKS, OF INDIANAPOLIS, INDIANA, A CORPORATION.

PROCESS OF MOLDING BOTTLES.

Application filed April 24, 1925. Serial No. 25,463.

*To all whom it may concern:*

Be it known that I, JOHN RAU, a citizen of the United States, and a resident of Indianapolis, county of Marion, and State of Indiana, have invented a certain new and useful Process of Molding Bottles; and I do hereby declare that the following is a full, clear, and exact description thereof, reference being had to the accompanying drawings, in which like numerals refer to like parts.

This invention pertains to the process of forming glass bottles in such a manner as to obtain more evenly formed walls.

It has been noticeable that in the formation of bottles or the like of glass, that there are certain irregularities in the thickness of the walls, both side and bottom. In forming bottles on automatic bottle blowing machines, from the usual type of blank, the inner surface of the bottom where it joins the side walls contains an excessive amount of glass as well as the inner surface of both the end and side walls, there being an insufficient amount of glass at the four corners. This is not only disfiguring to the bottle, but makes the same incapable of sufficient accurate measurement of the contents and furthermore developes a weakness at the four corners of the bottle which are most susceptible of breakage.

It is the object of this invention to so form the glass, and particularly the blank, as to provide what may be termed a foot or base portion, such as will cause proper distribution of the glass in the final blowing operation. This eliminates the objectionable features above described, and particularly the weakness of the corners, the bulging at the inner surfaces and edges, and, therefore, a more perfectly shaped bottle having the interior of its bottom portion more nearly conforming in shape to the exterior.

The full nature of the invention will be understood from the accompanying drawings and the following description and claims:

In the drawings, Figure 1 is a front elevation of a prior art bottle showing the inner surface thereof formed in dotted lines. Fig. 2 is a section taken on the line 2—2 of Fig. 1. Fig. 3 is a side elevation of the blank from which the prior art bottle is formed, showing the formation of the inner surface of the wall by dotted line after the blank has been blown. Fig. 4 is a central vertical section through the first mold used in the process, showing glass received therein from the furnace. Fig. 5 is the same as Fig. 4, showing the blank mold with the blank blown therein. Fig. 6 is a side elevation of the blank after being molded, as shown in Fig. 5, illustrating the same step in this process as is illustrated by Fig. 3 in the prior art process. Fig. 7 is a central vertical section taken through the finishing mold and the finished bottle formed therein. Fig. 8 is a plan view of the bottom of the blown blank looking in the direction of the line 8—8 with respect to Fig. 6. Fig. 9 is a section taken on the line 9—9 of Fig. 6.

In the drawings it is first desired to show a sample of the structural features of a finished glass bottle, which it is the purpose of this invention to obviate. The prior art illustrating such features is shown in Figs. 1 and 2. In Fig. 1 there is shown a bottle 10, the inner surface thereof being indicated by dotted lines. It will be noted therein that the walls 11 and 11ª are bellied inwardly, as best illustrated in Fig. 2. Also the walls 11ª at their connection with the bottom 12 are bellied upwardly, as indicated by the dotted line 12ª. At the same time there is a minimum of glass at the four corners, as indicated at 13. Bottles of this character have heretofore been made in the usual manner from a blank shown in Fig. 3, having a bottom 14, and if the bottom of such bottles is carefully observed, a line of demarcation will be found thereon as illustrated by line 15 in Fig. 2, of substantially the same shape and dimensions as the bottom 14 of the blank. This is caused by the bottom 14 of the blank becoming sufficiently cool to retain its shape, while the remaining portion of the glass in the blank is forced outwardly to the area of the finished bottom. Thus the bottom 14 of the blank retains a mark on the finished bottom, as shown by the dotted line 15. The bottom 14 of the prior art blank will hold to its size and shape while the balance of the glass contained in the walls is forced outwardly, this bulging being around the bottom portion of the bottle, as illustrated in Figs. 1 and 2.

This invention, the process of which is indicated in Figs. 4, 5, 6 and 7, consists of the usual practice of providing a blank mold 20 having a bottom blank mold 21 for receiving a globule of glass when it is dropped therein, and which shapes the head 22 of the blank. A plunger 23 forms the mouth of the bottle, after which the top of the mold is capped by the head 24 having an air passage 25 therethrough, through which compressed air is directed into the mold for forcing the glass 26 contained therein down so as to be properly formed in the head mold 21. Upon completion of this operation, the plunger 23 is withdrawn and replaced by an air head 27, and the head 24 is replaced by the foot mold 28. Thereupon air is blown from the bottom through the head 22 of the bottle in the usual manner through an air passage 29. This forces the glass upwardly against the foot mold 28 and produces the inner air space of the blank.

It will here be noted that the top of the mold 20, combined with the foot mold 28, is so constructed as to provide a mold for forming the foot 30 of the blank, which is the important feature of this process. This foot, as best shown in Figs. 6, 8 and 9, is of substantially the same size and shape as the bottom of the finished bottle. Therefore, in the completion of the bottle there is required no further expansion of the foot or bottom of the blank. Accordingly upon the completion of the formation of the blank, both the head and the foot of the finished bottle are completely formed.

After the blank has been formed, as shown in Figs. 6, 8 and 9, it is transferred through the medium of the head mold 21 to the finishing mold 31, as shown in Fig. 7. A bottom plate 32 is brought into position and an air cap 33 is clamped down over the head mold 21 and compressed air forced through the passage 34 into the head of the bottle 22 and the interior of the blank, forcing the same outwardly against the walls of the mold and thus finishing and completing the bottle 35. The fact that the bottom 36 of the bottle has been preformed as in the foot 30, permits the remaining portion of the blank to be forced outwardly to the extremities thereof without the distorting effect shown in the prior art Figs. 1 and 2. Thus the lower portion of the side walls are formed of substantially the same relative thickness and the bottom surface is formed relatively flat with the same or slightly more glass provided at the corners for strengthening the same.

The invention claimed is:

1. The process of forming a bottle or the like of glass, consisting of blowing a blank having a neck with a head thereon of the usual character, and forming at the opposite end of said blank an enlarged portion extending laterally beyond the walls of the blank.

2. The process of forming a bottle or the like of glass, consisting of blowing a blank having a neck with a head thereon of the usual character, and forming at the opposite end of said blank a foot portion protruding beyond the wall of said blank, said portion being relatively flat and of substantially the same thickness as the bottom of the bottle to be formed therefrom.

3. The process of forming a bottle or the like of glass, consisting of blowing a blank having a neck with a head thereon of the usual character, and forming at the opposite end of said blank a foot portion protruding beyond the outer wall of the blank and being of an area substantially that of the bottom of the completed bottle.

4. The process of forming a bottle or the like of glass, consisting of blowing a blank having a neck with a head thereon of the usual character, and forming at the opposite end of said blank a foot portion in the form of a base having substantial thickness and extending outwardly from the wall of the blank to an area substantially that of the bottom of the completed bottle.

5. The process of forming a bottle or the like of glass, consisting of blowing a blank having a neck with a head thereon of the usual character, and forming at the opposite end of said blank an enlarged portion of greater area at the bottom than the area of a plane taken through any other portion of said blank.

6. The process of forming glass bottles or the like, consisting of blowing a blank having an enlarged bottom portion, and thereafter placing said blank in a suitable mold and blowing the same into a finished bottle.

7. The process of forming glass bottles or the like, consisting of blowing a blank, molding a neck on one end thereof and an outwardly projecting foot portion on the other end, and thereafter blowing the walls of said bottle to conform substantially to the outline of said foot portion.

8. The process of forming glass bottles or the like, consisting of blowing a blank and molding the same during the blowing operation in a blank mold for forming a neck at one end thereof and a foot portion extending outwardly from the wall of the blank of substantially the area of the bottom in the finished bottle, and thereafter placing said blank in a finishing mold and blowing the walls thereof to conform substantially with the area of said foot portion.

9. The process of forming a bottle or the like of glass, consisting of blowing a blank of the usual character, and forming at the bottom of said blank a foot portion of an area substantially that of the bottom of the bottle into which said blank is adapted to be formed.

10. The process of forming a bottle or the like of glass, consisting of blowing a blank of the usual character, and forming at one end of said blank a foot portion of substantially the same area and thickness as the bottom of the finished bottle into which the blank is adapted to be formed.

11. The process of forming glass bottles or the like, consisting of blowing a blank and molding the same during the following operation in a blank mold for forming a neck at one end thereof and a foot portion formed on the other end of said blank of substantially the same area and thickness as the bottom of the finished bottle into which the blank is adapted to be formed, and thereafter placing said blank in a finishing mold and blowing the walls thereof to conform to the proper design for the finished bottle, the bottom of said finished bottle remaining substantially the same in area and thickness as the foot portion of said blank.

In witness whereof, I have hereunto affixed my signature.

JOHN RAU.